(12) United States Patent
Kahana et al.

(10) Patent No.: US 10,019,602 B2
(45) Date of Patent: Jul. 10, 2018

(54) SYSTEM AND METHOD FOR IMPROVED SECURITY FOR A PROCESSOR IN A PORTABLE COMPUTING DEVICE (PCD)

(71) Applicant: QUALCOMM INCORPORATED, San Diego, CA (US)

(72) Inventors: Yoni Kahana, Beit Shemesh (IL); Laurence Geoffrey Lundblade, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 14/472,249

(22) Filed: Aug. 28, 2014

(65) Prior Publication Data

US 2016/0063281 A1 Mar. 3, 2016

(51) Int. Cl.
| | |
|---|---|
| *G06F 21/71* | (2013.01) |
| *G06F 21/75* | (2013.01) |
| *G06F 21/52* | (2013.01) |
| *G06F 21/76* | (2013.01) |

(52) U.S. Cl.
CPC .............. *G06F 21/71* (2013.01); *G06F 21/52* (2013.01); *G06F 21/75* (2013.01); *G06F 21/76* (2013.01); *G06F 2221/2103* (2013.01); *G06F 2221/2137* (2013.01)

(58) Field of Classification Search
CPC ........ G06F 1/206; G06F 1/3203; G06F 1/324; G06F 1/3296; G06F 11/3031; G06F 11/3058; G06F 11/3037; G06N 99/005; G05F 1/66; Y02B 60/1285; Y02B 60/1217
See application file for complete search history.

(56) References Cited

U.S. PATENT DOCUMENTS

| | | | | |
|---|---|---|---|---|
| 5,333,272 A | * | 7/1994 | Capek ................... | G06F 11/327 714/E11.003 |
| 7,349,871 B2 | * | 3/2008 | Labrou .................. | G06Q 20/02 705/26.35 |
| 7,704,147 B2 | * | 4/2010 | Quraishi ................. | G07F 17/32 463/17 |

(Continued)

FOREIGN PATENT DOCUMENTS

| | | |
|---|---|---|
| EP | 2393007 A1 | 12/2011 |
| WO | 2004055634 A2 | 7/2004 |

OTHER PUBLICATIONS

International Search Report and Written Opinion—PCT/US2015/046183—ISA/EPO—dated Oct. 28, 2015.

*Primary Examiner* — Hadi S Armouche
*Assistant Examiner* — Shu C Gao
(74) *Attorney, Agent, or Firm* — Smith Tempel Blaha LLC

(57) ABSTRACT

Systems and methods for improved security for a core in a portable computing device (PCD), such as a core operating a high level operating system (HLOS) are presented. In operation, a monitor module on the SoC is initialized. The monitor module sends a request to the core of the SoC and the monitor module receives a response from the core. A timer in communication with the monitor module is checked. The timer is reset or disabled by the monitor module if the response from the core is received at the monitor module before the expiration of the timer. Otherwise, the monitor module applies at least one security measure to the core as a result of the timer expiring.

26 Claims, 8 Drawing Sheets

(56) References Cited

U.S. PATENT DOCUMENTS

| | | | |
|---|---|---|---|
| 7,801,826 B2* | 9/2010 | Labrou | G06Q 20/02 705/50 |
| 7,819,750 B2* | 10/2010 | Lam | G07F 17/3202 463/29 |
| 8,060,732 B2 | 11/2011 | Jones et al. | |
| 8,117,469 B2* | 2/2012 | Schmitz | G06F 1/3203 713/300 |
| 8,458,533 B2 | 6/2013 | Lavery | |
| 2004/0029527 A1* | 2/2004 | Endo | H04W 52/028 455/11.1 |
| 2005/0223239 A1* | 10/2005 | Dotan | G06F 21/52 713/188 |
| 2006/0123226 A1* | 6/2006 | Kumar | H04L 63/0281 713/154 |
| 2007/0016952 A1* | 1/2007 | Stevens | G06F 21/51 726/24 |
| 2007/0220182 A1* | 9/2007 | Telesco | G06F 9/542 710/11 |
| 2007/0226795 A1* | 9/2007 | Conti | G06F 21/74 726/22 |
| 2007/0283140 A1* | 12/2007 | Jones | G06F 9/4403 713/2 |
| 2008/0307240 A1* | 12/2008 | Dahan | G06F 1/06 713/320 |
| 2010/0031325 A1* | 2/2010 | Maigne | G06F 9/45533 726/4 |
| 2010/0122244 A1* | 5/2010 | Sato | G06F 8/65 717/168 |
| 2011/0004768 A1* | 1/2011 | Cho | G03G 15/5066 713/182 |
| 2011/0055538 A1* | 3/2011 | Cho | G06F 9/4418 713/2 |
| 2012/0110388 A1* | 5/2012 | Lavery | G06F 11/0757 714/47.1 |
| 2012/0246641 A1 | 9/2012 | Gehrmann | |
| 2013/0279689 A1* | 10/2013 | Obaidi | H04L 9/28 380/28 |
| 2013/0282951 A1 | 10/2013 | Kuo et al. | |
| 2013/0347131 A1* | 12/2013 | Mooring | G06F 9/45558 726/29 |
| 2014/0043957 A1* | 2/2014 | Venkatraman | H04L 41/0672 370/216 |
| 2015/0137618 A1* | 5/2015 | Vaajala | H02H 3/0935 307/116 |

\* cited by examiner

400 —↘

┌─────────────────────────────────┐
│   MINIMUM SECURITY STATE  405   │
└─────────────────────────────────┘

- LONGER MONITOR TIMER INTERVAL
- NO ACTION BY MONITOR UNTIL TIMER TRIGGERED MORE THAN ONCE
- MINIMAL DISRUPTION OF DEVICE OPERATION AND/OR END USER WARNING MESSAGE

┌─────────────────────────────────┐
│          DRM STATE  410         │
└─────────────────────────────────┘

- MEDIUM MONITOR TIMER INTERVAL
- ACTION BY MONITOR WHEN TIMER TRIGGERS AND ATTEMPTING TO PLAY MEDIA
- PREVENT OPERATION OF AUDIO/VISUAL ENCODER AND/OR PREVENT PLAYING CERTAIN MEDIA

┌─────────────────────────────────┐
│   MEDIUM SECURITY STATE  415    │
└─────────────────────────────────┘

- MEDIUM MONITOR TIMER INTERVAL
- ACTION BY MONITOR WHEN TIMER TRIGGERS
- PREVENT CORE CPU COMMUNICATION WITH PERIPHERALS
- OPTIONALLY CREATE OR SEND LOG/REPORT

┌─────────────────────────────────┐
│   MAXIMUM SECURITY STATE  420   │
└─────────────────────────────────┘

- SHORT MONITOR TIMER INTERVAL
- ACTION BY MONITOR WHEN TIMER TRIGGERS
- REBOOT CORE AND/OR ENTIRE SoC
- SEND LOG/REPORT TO REMOTE SERVER

*FIG. 4*

SYSTEM AND METHOD FOR IMPROVED SECURITY FOR A PROCESSOR IN A PORTABLE COMPUTING DEVICE (PCD)

DESCRIPTION OF THE RELATED ART

Devices with a processor that communicate with other devices through a variety of communication media, including wireless signals, are ubiquitous. Mobile devices including portable computing devices (PCDs) may be used to communicate with a variety of other devices via wireless, analog, digital and other means. These mobile devices may include mobile telephones, portable digital assistants (PDAs), portable game consoles, palmtop computers, tablet computers and other portable electronic devices.

In addition to the primary function, PCDs may also be used for downloading and playing games; downloading and playing music; downloading and viewing video; global positioning system (GPS) navigation, web browsing, and running applications such as calendaring and address applications, electronic wallet software, and more.

To accommodate these ever-growing uses and demands for higher performance, modern PCDs typically include a system-on-a-chip (SoC) comprising one or more cores (e.g., central processing unit(s), graphics processing unit(s), etc.) for controlling or performing varying functions of the PCD. However, operating each core/CPU increases the power consumption on the PCD, reducing battery life, increasing touch temperatures of the PCD, degrading service, etc.

Inherent in the ever-increasing uses for PCDs, however, is an increased risk of security breaches, which can have significant adverse effects. Previous attempts to address these security issues have limitations. Software solutions still have high potential for security holes and may be difficult to validate. Hardware solutions have consumed too much power and/or chip area for effective implementation in a SoC.

These previous attempts can be easily circumvented by a vendor of a SoC manufacturer implementing the SoC into a PCD for example, that may have the ability to alter the embedded operating system, such as a high-level operating system (HLOS) to ensure compatibility between the SoC and the vendor's PCD circumventing previous attempts to provide security for the SoC to be used in the PCD. Similarly, end users attempting to "jailbreak" the PCD may alter the operating system and further circumvent previous attempts to provide security for the SoC.

Thus, there is a need for improved systems and methods to improve security of a SoC used in a PCD.

SUMMARY OF THE DISCLOSURE

Systems and methods are disclosed that allow for improved security for a core on a system-on-a-chip (SoC) in a portable computing device (PCD). In operation, a monitor module on the SoC is initialized. The monitor module sends a request to the core of the SoC and the monitor module receives a response from the core. A timer in communication with the monitor module is checked. The timer is reset or disabled by the monitor module if the response from the core is received at the monitor module before the expiration of the timer. Otherwise, the monitor module applies at least one security measure to the core as a result of the timer expiring.

One example embodiment is a PCD comprising a core on a system-on-a-chip (SoC). A monitor module on the SoC is in communication with the core, and a timer is in communication with the monitor module. In the example embodiment, the monitor module is configured to: send a request to the core; receive a response from the core; and reset the timer if the response is received by the monitor module before the expiration of the timer, or apply at least one security measure to the core as a result of the timer expiring.

Another example embodiment is a computer program product comprising a non-transitory computer usable medium having a computer readable program code embodied therein, said computer readable program code adapted to be executed to implement a method for improved security for a core in a portable computing device (PCD), the method comprising: initializing a monitor module on the SoC; sending a request from the monitor module of the SoC to the core of the SoC; receiving at the monitor module a response from the core; checking a timer in communication with the monitor module; and resetting the timer with the monitor module if the response is received at the monitor module before the expiration of the timer, or applying with the monitor module at least one security measure to the core as a result of the timer expiring.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures. Similarly, for reference numerals with ' designations, such as 102', the ' designation may designate an alternative embodiment for the underlying element with the same reference numerals (but without the ' designation).

FIG. 4 is an illustration of exemplary security states under which the exemplary systems of FIG. 2 and/or FIG. 3 may operate;

DETAILED DESCRIPTION

Figure 1:
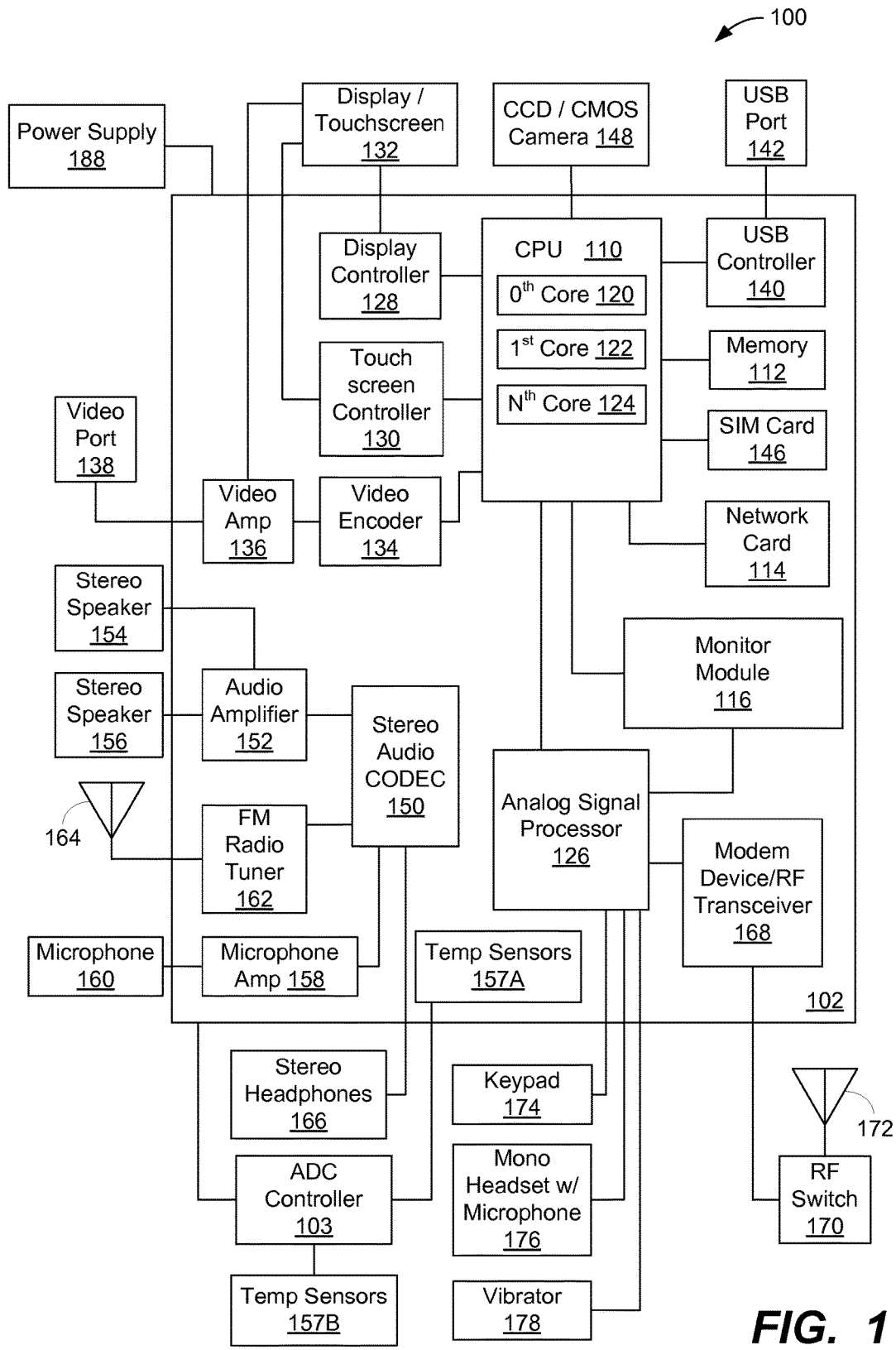
FIG. 1 is a block diagram of an example embodiment of a portable computing device (PCD) in which the present invention may be implemented.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files or data values that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "portable computing device" ("PCD") is used to describe any device operating on a limited capacity rechargeable power source, such as a battery and/or capacitor. Although PCDs with rechargeable power sources have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop or tablet computer with a wireless connection, among others.

In this description, the terms "central processing unit ("CPU")," "digital signal processor ("DSP")," "graphics processing unit ("GPU")," "chip," "video codec," "system bus," "image processor," and "media display processor ("MDP")" are non-limiting examples of processing components that may be implemented on an SoC. These terms for processing components are used interchangeably except when otherwise indicated. Moreover, as discussed below, any of the above or their equivalents may be implemented in, or comprised of, one or more distinct processing components generally referred to herein as "core(s)" and/or "sub-core(s)."

In this description, the terms "workload," "process load," "process workload," and "graphical workload" may be used interchangeably and generally directed toward the processing burden, or percentage of processing burden, that is associated with, or may be assigned to, a given processing component in a given embodiment. Additionally, the related terms "frame," "code block" and "block of code" may be used interchangeably to refer to a portion or segment of a given workload. Further to that which is defined above, a "processing component" or the like may be, but is not limited to being, a central processing unit, a graphical processing unit, a core, a main core, a sub-core, a processing area, a hardware engine, etc. or any component residing within, or external to, an integrated circuit within a portable computing device.

One of ordinary skill in the art will recognize that the term "MIPS" represents the number of millions of instructions per second a processor is able to process at a given power frequency. In this description, the term is used as a general unit of measure to indicate relative levels of processor performance in the exemplary embodiments and will not be construed to suggest that any given embodiment falling within the scope of this disclosure must, or must not, include a processor having any specific Dhrystone rating or processing capacity. Additionally, as would be understood by one of ordinary skill in the art, a processor's MIPS setting directly correlates with the power, frequency, or operating frequency, being supplied to the processor.

The present systems and methods for improved security for a processor or core in a PCD provide a cost effective way to implement a monitor module on a system-on-a-chip (SoC) along with one or more additional processors, including a processor operating a High Level Operating System ("HLOS"). The monitor module initializes in response to the initialization of the SoC in a manner that assures the integrity of the monitor module. Additionally, the monitor module may then act to ensure the security of one or more processors or cores of the SoC by monitoring the status of the core and implementing security measures on one or more cores if the status of those cores changes in a negative or unexpected way, or if the core(s) fail to provide information, data, and/or code required by the monitor module.

In the present systems and methods, the monitor module itself may be a simple component dependent with limited RAM or ROM memory, such that the monitor module is dependent upon another core, such as a HLOS core, for the boot up code needed to initialize. After boot up, the monitor module monitors the status of one or more cores on the SoC as desired using a timer that may only be reset by the monitor module. The present systems and methods allow for robust and flexible security for one or more cores of the SoC by implementing a monitor module that places minimal burden on the SoC in both power consumption and chip area of the SoC.

During operation, an SoC may be initialized, triggering the initialization of the monitor module. The monitor module then sets a timer and requests information from a core on the SoC. In the case of an initialization of the SoC, the information requested may be boot code necessary for the monitor module to finish initialization and/or operate. If the monitor module does not receive the expected information prior to the timer expiring and/or if the information received by the monitor module is not what the monitor module was expecting, the monitor module can implement security measures on the core, including holding that core "hostage" until the requested information is provided and/or re-initializing the entire SoC. If the monitor module receives the requested information before the timer expires, the monitor module resets the timer and depending on the implementation, the monitor module may shut itself off, or enter a reduced power sleep or idle mode, for a predetermined time interval/ predetermined future event, or the monitor module may continue to monitor the operations of one or more core(s) of the SoC, including an HLOS core.

In some implementations, the monitor module may monitor the status of one or more cores of the SoC by checking the status of the core and either allowing the timer to continue counting if the status of the core changes, or resetting the timer if the status of the core does not change. In the event that the timer expires, the monitor module applies at least one security measure to the core as a result of the timer expiring. The security measures may include reinitializing the entire SoC, reinitializing the particular core, preventing the core from accessing data stored on the PCD, preventing the core from accessing one or more other components on the SoC, and/or causing a warning appear on a display of the PCD. The security measures may also be applied in accordance with predefined security policies, such as a present security level state. Similarly, the security measures may be applied in the tiered fashion if desired, with more severe measures reserved for multiple or sequential expirations of the timer.

In one embodiment, the monitor module may be implemented with a processor, limited RAM or ROM memory and a timer, but without direct access to flash memory. In other embodiments, the monitor module may be implemented virtually, for example as a portion or partition of a core, such as the core operating the HLOS. This ability to provide robust and flexible security measures for one or more cores on an SoC, while minimizing the monitor module's power consumption and/or footprint on the SoC allows for improved security for the processors or cores in a PCD in a cost effective manner.

The system for providing improved security for a processor or core in a PCD described herein, or portions of the system, may be implemented in hardware or software. If implemented in hardware, the devices can include any, or a combination of, the following technologies, which are all well known in the art: discrete electronic components, an integrated circuit, an application-specific integrated circuit having appropriately configured semiconductor devices and resistive elements, etc. Any of these hardware devices, whether acting or alone, with other devices, or other components such as a memory may also form or comprise components or means for performing various operations or steps of the disclosed methods.

When a PCD or other system described herein is implemented, or partially implemented, in software, the software portion can be used to perform various steps of the methods described herein, including initializing the SoC and/or a monitor module of the SoC. The software portion may also be used to receive at the monitor module information from a core, verify the information received, set/reset a timer that is in communication with the monitor module, and/or implement security measures on one or more cores of the SoC. Similarly, the software portion can be used to monitor a status of a core by allowing the timer to continue counting if the status of the core changes, or by resetting the timer if the status of the core does not change. The software portion can be used to also apply one or more security measures to the core (or to reset the entire SoC) as a result of the timer expiring.

The software and data used in representing various elements can be stored in a memory and executed by a suitable instruction execution system (microprocessor). The software may comprise an ordered listing of executable instructions for implementing logical functions, and can be embodied in any "processor-readable medium" for use by or in connection with an instruction execution system, apparatus, or device, such as a single or multiple-core processor or processor-containing system. Such systems will generally access the instructions from the instruction execution system, apparatus, or device and execute the instructions.

FIG. 1 is a block diagram of an exemplary, non-limiting aspect of a PCD 100 that may implement the present systems and methods in the form of a wireless telephone capable of communicating with one or more wireless communication system. Such wireless communication system may be a broadband wireless communication system, including a Long Term Evolution (LTE) system, a Code Division Multiple Access (CDMA) system, a Frequency Division Multiple Access (FDMA) system, a Global System for Mobile Communications (GSM) system, a wireless local area network (WLAN) system, some other wireless system, or a combination of any of these. A CDMA system may implement Wideband CDMA (WCDMA), CDMA 1x, Evolution-Data Optimized (EVDO), Time Division Synchronous CDMA (TDSCDMA), or some other version of CDMA.

As shown, the PCD 100 includes an on-chip system (or SoC) 102 that includes a heterogeneous multi-core central processing unit ("CPU") 110 and an analog signal processor 126 that are coupled together. The CPU 110 may comprise a zeroth core 120, a first core 122, and an Nth core 124 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 120, 122, 124 may process workloads at different efficiencies under similar operating conditions. Each of the cores 120, 122, 124 may control one or more function of the PCD 100. For example, the first core 120 may be a graphics processing unit (GPU) for controlling graphics in the PCD 100. Such GPU/first core 120 may further include drivers and/or other components necessary to control the graphics in the PCD 100, including controlling communications between the GPU core 120 and memory 112 (including buffers). For another example, a different core such as the Nth core 124 may run the PCD operating system, such as a high-level operating system (HLOS). Such Nth/HLOS core 124 may further include drivers, hardware interfaces, and/or other components necessary to run the HLOS, including communications between the core 230 and memory 112 (which may include flash memory).

The PCD 100 may include a monitor module 116 in communication with the multicore CPU 110 and/or one or more of the cores 120, 122, 124. The monitor module 116 may operate to provide security to some or all of the cores as described below. The monitor module 116 may comprise software which is executed by the multicore CPU 110. However, the monitor module 116 may also be formed from hardware and/or firmware without departing from the scope of the disclosure. In other implementations, the PCD 100 may not include a monitor module 116 separate from the multi-core CPU 110, but the monitor module 116 may instead be part of the multi-core CPU 110. In such embodiments, the monitor module 116 may be implemented as a separate logic, software, or firmware component of the multi-core CPU 110 or the monitor module 116 may be implemented virtually, such as being implemented as a partition or portion of one or more of the cores 120, 122, 124.

As illustrated in FIG. 1, a display controller 128 and a touch screen controller 130 are coupled to the multicore CPU 110. In turn, a display/touchscreen 132, external to the on-chip system 102, is coupled to the display controller 128 and the touch screen controller 130. A digital camera 148 may also be coupled to the multicore CPU 110. In such embodiments, the digital camera 148 may be controlled by one of the cores of the multicore CPU 110. In an exemplary aspect, the digital camera 148 is a charge-coupled device (CCD) camera or a complementary metal-oxide semiconductor (CMOS) camera The PCD 100 of FIG. 1 may further include a video encoder 134, e.g., a phase alternating line (PAL) encoder, a sequential couleur a memoire (SECAM) encoder, or a national television system(s) committee (NTSC) encoder, or any other type of video decoder 134 coupled to the multicore CPU 110. Further, a video amplifier 136 is coupled to the video encoder 134 and the display/touchscreen 132. A video port 138 is coupled to the video amplifier 136. As depicted in FIG. 1, a universal serial bus (USB) controller 140 is coupled to the multicore CPU 110. Also, a USB port 142 is coupled to the USB controller 140. A memory 112 is also illustrated as coupled to the multicore CPU 110. Such memory 112 may for example be random access memory (RAM), read only memory (ROM), flash memory, or any combination thereof. A subscriber identity module (SIM) card 146 may also be coupled to the multicore CPU 110. In other embodiments, multiple SIM cards 146 may be implemented.

As further illustrated in FIG. 1, a stereo audio CODEC 150 may be coupled to the multicore CPU 110. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation (FM) radio tuner 162 may be coupled to the stereo audio CODEC 150. Also, a FM antenna 164 is coupled to the FM radio tuner 162. Further, stereo headphones 166 may be coupled to the stereo audio CODEC 150.

FIG. 1 further indicates that a modem device/radio frequency ("RF") transceiver 168 may be coupled to the multicore CPU 110. The modem device 168 may support one or more of the wireless communications protocols, such as GSM, CDMA, W-CDMA, TDSCDMA, LTE, and variations of LTE such as, but not limited to, FDB/LTE and PDD/LTE wireless protocols. Additionally, there may be multiple modem devices 168, and in such embodiments, different modem devices 168 may support come or all of the wireless communication protocols and/or technologies listed above.

In some implementations the modem device 168 may be further comprised of various components, including a separate processor, memory, and/or RF transceiver. In other implementations the modem device 168 may simply be an RF transceiver. Further, the modem device 168 may be incorporated in an integrated circuit. That is, the components comprising the modem device 168 may be a full solution in a chip and include its own processor and/or core that may be monitored by the systems and methods described herein. Alternatively, various components comprising the modem device 168 may be coupled to the multicore CPU 110 and controlled by one of the cores 120, 122, 124 of the CUP 110. An RF switch 170 may be coupled to the modem device 168 and an RF antenna 172. In various embodiments, there may be multiple RF antennas 172, and each such RF antenna 172 may be coupled to the modem device 168 through an RF switch 170.

As shown in FIG. 1, a keypad 174 may be coupled to the multicore CPU 110 either directly, or through the analog signal processor 126. Also, a mono headset with a microphone 176 may be coupled to the multicore CPU 110 and or analog signal processor 126. Further, a vibrator device 178 may also be coupled to the multicore CPU 110 and/or analog signal processor 126. FIG. 1 also shows that a power supply 188 may be coupled to the on-chip system 102, and in some implementations the power supply 188 is coupled via the USB controller 140. In a particular aspect, the power supply 188 is a direct current (DC) power supply that provides power to the various components of the PCD 100 that require power. Further, in a particular aspect, the power supply 188 may be a rechargeable DC battery or a DC power supply that is derived from an alternating current (AC) to DC transformer that is connected to an AC power source.

The multicore CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103. However, other types of thermal sensors 157 may be employed without departing from the scope of the disclosure.

FIG. 1 further indicates that the PCD 110 may also include a network card 114 that may be used to access a data network, e.g., a local area network, a personal area network, or any other network. The network card 114 may be a Bluetooth network card, a WiFi network card, a personal area network (PAN) card, or any other network card well known in the art. Further, the network card 114 may be incorporated in an integrated circuit. That is, the network card 114 may be a full solution in a chip, and may not be a separate network card 114.

As depicted in FIG. 1, the display/touchscreen 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, and the power supply 180 are external to the SoC 102.

The SoC 102 may also include various bus controllers (not shown). For example, a first example of a may be responsive to signals in the bus interface that communicatively couples the CPU 110 to components of a multimedia subsystem, including the video encoder 134. It should be understood that any number of similarly configured bus controllers can be arranged to monitor a bus interface arranged in the on-chip system 102. Alternatively, a single bus controller could be configured with inputs arranged to monitor two or more bus interfaces that communicate signals between CPU 110 and various subsystems of the PCD 100 as may be desired.

In a particular aspect, one or more of the method steps described herein may be enabled via a combination of data and processor instructions stored in the memory 112 and/or a memory located on the CPU 110. These instructions may be executed by one or more cores 120, 122, 124 in the multicore CPU 110 in order to perform the methods described herein. Further, the multicore CPU 110, one or more of the cores 120, 122, 124, the memory 112, the monitor module 116, or a combination thereof may serve as a means for executing one or more of the method steps described herein in order enable improved security for a processor or core in a PCD.

Figure 2:
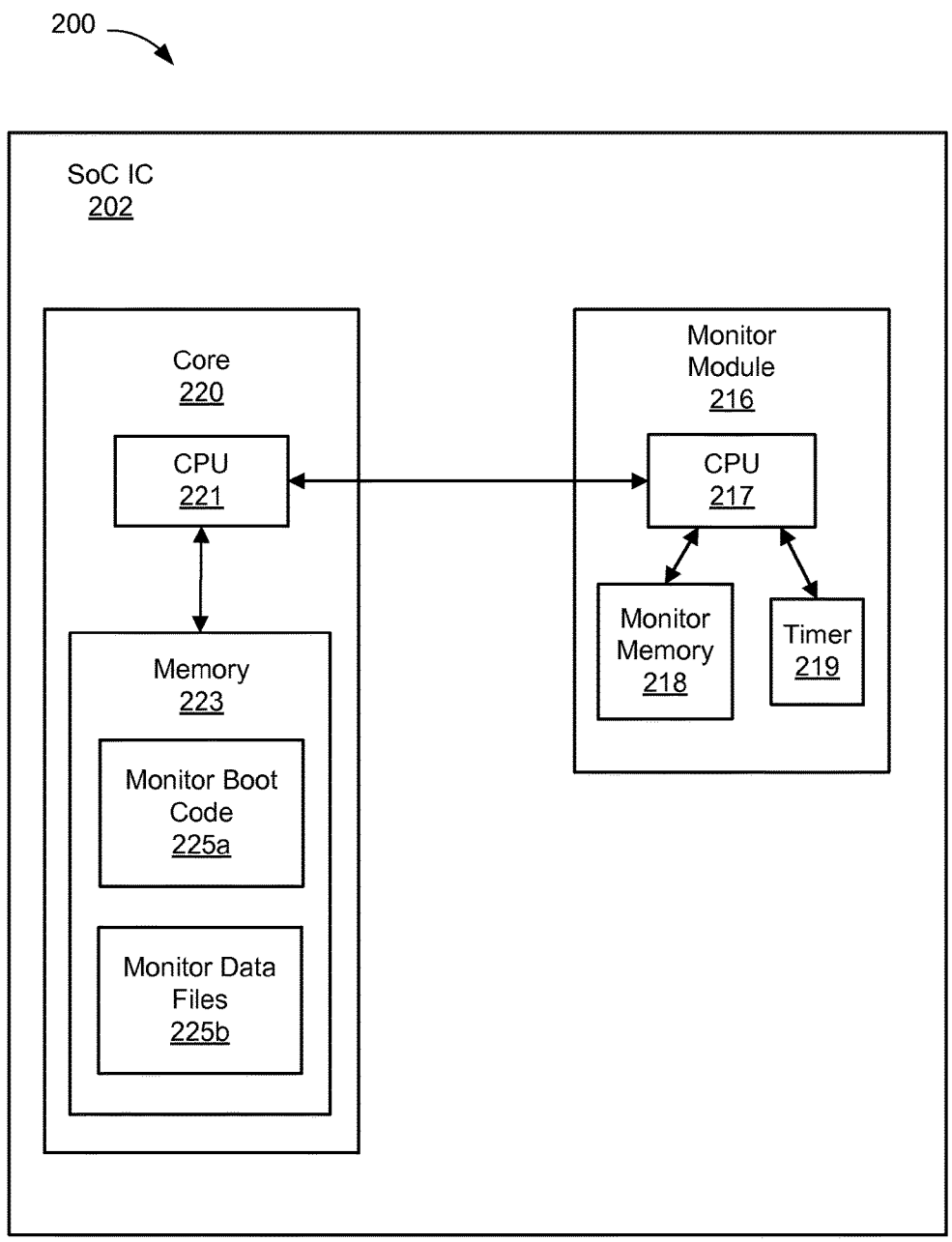
FIG. 2 is a block diagram showing an exemplary system for improved security for a processor in a PCD, such as the PCD embodiment illustrated in FIG. 1.

FIG. 2 is a block diagram showing an exemplary system for improved security for a processor or core in a PCD, such as the PCD embodiment illustrated in FIG. 1. As shown in FIG. 2, the exemplary system includes a system-on-a-chip (SoC) integrated circuit (IC) 202, which could be implemented in a PCD (similar to the SoC 102 in FIG. 1). The SoC IC 202 of FIG. 2 includes a core 220 and a monitor module 216. The core 220 could be one of the cores 120, 122, 124 from the multi-core CPU 110 of FIG. 1, and in one embodiment may be a core 120, 122, 124 running a HLOS for the PCD 100.

As shown in FIG. 2, the core 220 includes a CPU 221 coupled to a memory 223. The CPU 221 could be any of the types of processors discussed above with respect for FIG. 1 and may be a dedicated processor for a functionality of the SoC IC 202 (such as a HLOS), or may be a more general processor that performs multiple functions for the SoC IC 202. In some embodiments, the CPU 221 could be used also run, control, or operate other functionality of the SoC IC 202 or PCD.

The memory 223 may be any type of memory desired, and may be a memory 223 dedicated to the core 220, or may be memory that is shared among one or more additional cores or processors in addition to the core 220. In some embodiments, the memory 223 is a flash memory. While the memory 223 is illustrated in FIG. 2 as being located within the core 220, the memory 223 may also be located physically apart from the core 220, elsewhere on the SoC IC 202 or in the PCD. In the embodiment illustrated in FIG. 2, the memory 223 contains monitor boot code 225a that the monitor module 216 needs in order to begin operation, as well as monitor data files 225b that the monitor module 216 needs during its operation as discussed below.

The exemplary system of FIG. 2 also includes a monitor module 216 on the SoC IC 202 in communication with the core 220. In the system illustrated, the monitor module 216 includes a CPU 217 in communication with the CPU 22 of the core 220. The monitor CPU 217 may also be any of the types of processors discussed above with respect for FIG. 1, and may be a dedicated processor for the monitor module 216. Although shown as separate components on the SoC IC 202 in FIG. 2, in some embodiments, the monitor module 216 may be a part of the core 220, such as a virtual portion or partition of the core 220. In such embodiments, the CPU 217 would be a portion or partition of the CPU 221 rather than a separate physical component as illustrated in FIG. 2.

The monitor module 216 of FIG. 2 also includes a monitor memory 218 and a timer 219, both in communication with the monitor CPU 217. In the embodiment of FIG. 2, the memory is preferably a random access memory (RAM) or a read only memory (ROM), but is preferably not a flash memory. Typical flash memories require more sophisticated drivers and are more complicated to implement/interface with than RAM or ROM memories.

For the embodiment illustrated in FIG. 2, it may be desired to keep the monitor module 216 simple and efficient, minimizing both the power consumption to operate the monitor module 216, and the chip area of the SOC IC 202 required to implement the monitor module 216. Code and/or data that would typically be stored in a flash memory are instead stored in one or more memories 223 of a core 220 with which the monitor module 216 is in communication, and which the monitor module 216 monitors. The monitor memory 218 may be a dedicated memory for the monitor module 216, or may be a portion of a memory (such as memory 112 in FIG. 1) that is shared by other processors, such as the cores 120, 122, 124 of the multi-core CPU 110 in FIG. 1. Additionally, although shown in FIG. 1 as part of the monitor module 216, the monitor memory 218 may be physically located apart from the monitor module 216, elsewhere on the SoC IC 202 or in the PCD.

As illustrated in FIG. 2, the monitor module 216 also includes a timer 219 in communication with the monitor CPU 217. The timer 219 may be used in some implementations to ensure that the core 220 at a minimum provides the necessary monitor boot code 225a to allow the monitor module 216 to properly boot. The timer 219 may also be used to ensure the core 220 provides any additional information such as monitor data files 225b needed by the monitor module 216 and/or to allow the monitor module 216 to monitor the ongoing operation of the core 220 to prevent unwanted changes, alterations, or actions by the core 220.

The timer 219 may be a hardware, firmware, or software component, and may be located with the monitor module 216, or may be located physically separate from (but in communication with) the monitor module 216. Additionally, although illustrated as a single component, the timer 219 may be comprised of multiple components, such as two timers (not shown) or a timer 319 and a counter 317 (see FIG. 3A). Regardless of how implemented, the timer 219 may not be reset by the core 220, but in the implementation of FIG. 2, may only be reset by the monitor module 216 as further discussed below.

Figure 3:
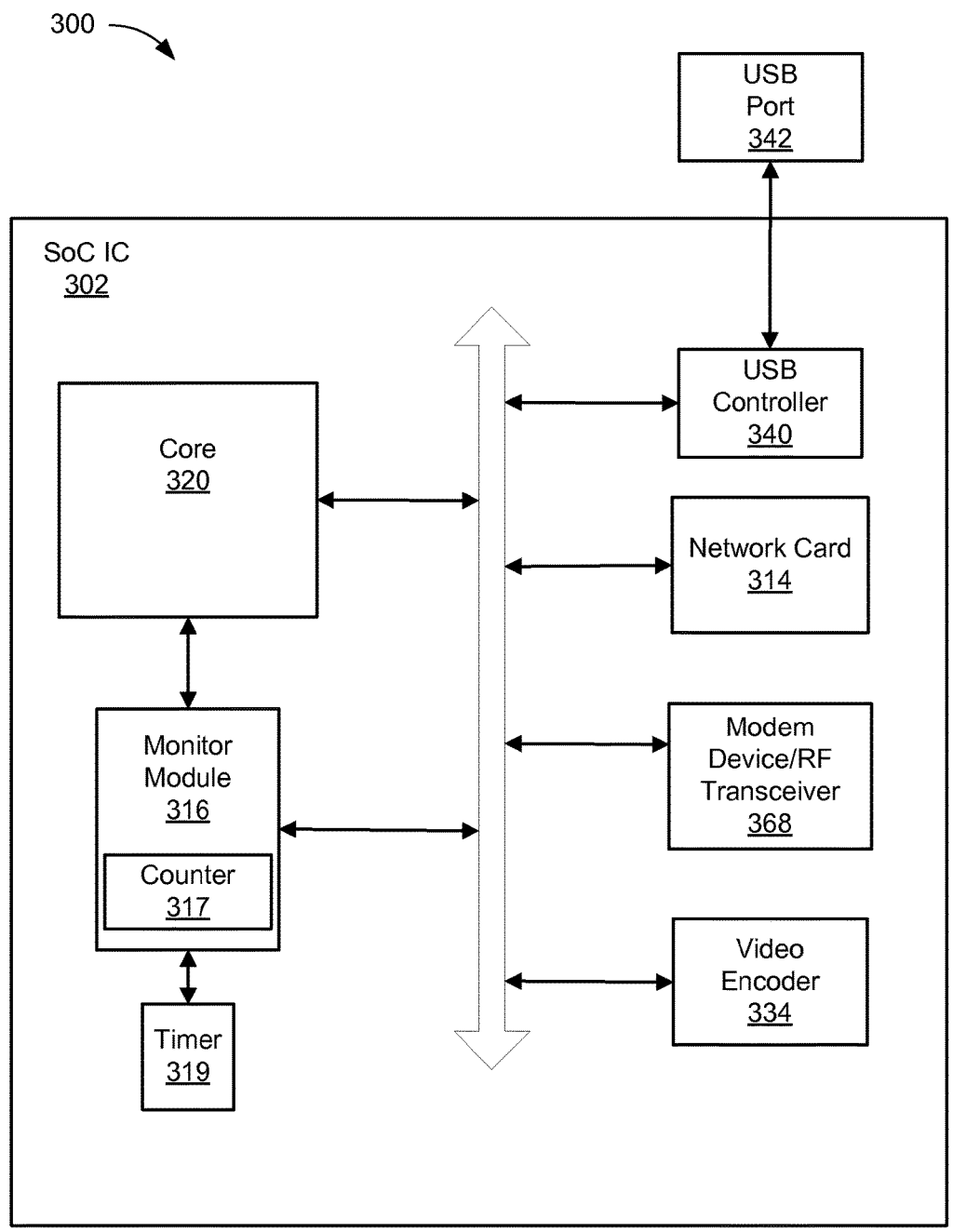
FIG. 3 is a block diagram of illustrating aspects of the exemplary system of FIG. 2 implemented with portions of the PCD embodiment illustrated in FIG. 1.

Turning to FIG. 3, a block diagram of aspects of the exemplary system of FIG. 2 implemented with portions of the PCD embodiment of FIG. 1 is illustrated. As shown in FIG. 3, a monitor module 316 in communication with a core 320 is provided on a SoC IC 302 of a PCD. The embodiment of the core 320 illustrated in FIG. 3 may include the additional components of the core 220 illustrated in FIG. 2. In other embodiments, the core 320 of FIG. 3 may simply be a processor such as one of the cores 120, 122, 124 of FIG. 1, while the functionality of the other portions of the core 220 of FIG. 2 are provided by components separate from the core 320. In yet other embodiments, the core 320 may be multiple separate cores, such as the cores 120, 122, 124, each separate core in communication with, or dedicated for, one of the additional components shown in FIG. 3 (i.e. a GPU core coupled to or dedicated for the video encoder 334, a modem core coupled to or dedicated for the modem device 368, etc.).

While the monitor module 316 of FIG. 3 is not illustrated with a memory or processor, like the monitor module 216 of FIG. 2, those components may be included within monitor module 316. In other embodiments, those components may not be located within the monitor module 316, and instead the functionality of those components may be provided by hardware, software, and/or firmware located separately from, but in communication with, the monitor module 316. The monitor module 316 includes a counter 317 and the monitor module 316 is also in communication with an external timer 319. Together, the counter 317 and external timer 319 of the embodiment of FIG. 3A perform the timing function for the monitor module 316.

The core 320 illustrated in FIG. 3 is also in communication with other portions or components of the SOC IC 302 and/or PCD, including the USB controller 340 (and through the USB controller 340, the USB port 342). The core 320 may be directly in communication with/and or controlling the USB controller 340. Alternatively, and/or at various times during operation of the PCD, the core 320 may be indirectly in communication with the USB controller 340, such as by being in communication with one or more component or processor (such as cores 120, 122, 124, or analog signal processor 126 of FIG. 1) that are directly in communication with USB controller 340. Direct or indirect communication with the USB controller 340 (and USB port 342) may allow the core 320 to input and/or output data over such as to other devices or computer systems connected to the PCD through the USB port 342 and/or to receive or provide inputs to peripherals connected to the PCD through the USB port 342.

The core 320 of FIG. 3 is also illustrated as being in communication with a network card 314 and modem device/ RF transceiver 368 of the SOC IC 302. Again, the core 320 may be directly in communication with/and or controlling these components of the SoC IC 302, allowing the core 320 to communicate wirelessly with other devices or computer systems to web browse, upload/download files, etc. Alternatively, and/or at various times during operation of the PCD, the core 320 may be indirectly in communication with the network card 314 and modem device/RF transceiver 368, such as by being in communication with one or more component or processor (such as cores 120, 122, 124, or analog signal processor 126 of FIG. 1) that are directly in communication with one or more of these components.

Finally, in the aspects illustrated in FIG. 3, the core 320 is also in communication with a video encoder 334 that may allow the PCD to play various media files, include video content. Again, the core 320 may be directly or indirectly in communication with/and or controlling the video encoder 334 as described above. se components of the SoC IC 302

In operation, at initialization of the SoC IC 302, which may be at a power up from a shutdown such as when the battery of the PCD is completely drained, the secure monitor module 316 also attempts to initialize/boot up. The core 320 contains, or has access to the monitor boot code 225 (see FIG. 2) or other information necessary for the monitor module 316 to properly initialize and/or operate. If the core 320 fails to provide the necessary code to the monitor module 316 in a timely fashion, or if the core 320 fails to provide the correct code needed for the monitor module 316 to properly initialize/operate, the timer 319 expires/is triggered which results in the monitor module 316 taking security measures. Such security measures may range from displaying a warning on a screen of the PCD to intervening in the boot up and/or operation of the core 320 and/or SoC IC 302.

In another implementation, after the monitor module 316 has initialized up, the monitor module 316 may perform additional monitoring of one or more processor or core of the SoC IC 302, including core 320. From time to time the monitor module 316 may need additional information, data, or data files to perform these additional functions, including for example additional data contained in core 320. In such implementations, the monitor module 316 may wake up, or otherwise trigger, request the additional information from the core 320. If the core fails to provide the additional information requested by the monitor module 316, the timer 319 expires/is triggered which also may result in the monitor module 316 taking one or more security measures, including holding the core "hostage" and/or causing the core 320 or SoC IC 302 to reboot/reinitialize.

In either example operation above, the core 320 may not itself stop or reset the timer 319, or cause the timer 319 to be reset, except by complying with the requirements of the monitor module 316. That is, unless the core 320 allows the secure monitor module 316 to properly boot up and/or operate, the monitor module 316 can intervene in the boot up and/or operation of the core 320 or SoC IC 302 to any level desired, including forcing the core 320 or SoC 302 IC to reinitialize/reboot entirely.

In the embodiment of FIG. 3, if the core 320 provides the proper code/requested information in a timely fashion to the monitor module 316, the monitor module 316 resets the timer 319 for some interval at which time the monitor module 316 may monitor, check or test the status of the core 320. Such monitoring of the status of the core 320 may be from the monitor module 316 receiving an automatic message from the core 320 at a predetermined time; the monitor module 316 shutting off and then restarting at a predetermined time to check the status of the core 320; the monitor module 316 sending a query to the core 320 and receiving a proper and timely response from the core 320; the monitor module 316 checking or testing to see if the code operating the core 320 has been altered since boot up or since the last check/test; or any other desired manner of verifying or testing the status of the core 320 or the security of the any other portion of the SoC IC 302, including the core 320.

If the result of testing/monitoring of the status of the core 320 is satisfactory or positive for example, i.e. the status of the core 320 has not changed in a way that was not authorized, the monitor module 316 rests the timer 319 for some interval (which may be the same as or different from the first interval mentioned above and/or which may be a randomly selected interval) to again monitor/check/test the core 320 and/or another component of the SoC IC 302. If the result of the testing/monitoring of the core 320 is not satisfactory/negative, i.e. the status has somehow changed in an unexpected or unauthorized manner or the core 320 has not provided requested data in a timely manner, the monitor module 316 may intervene in the initialization/boot up or in the ongoing operation of the core 320 or SoC IC 302.

In some embodiments, the monitor module 316 may implement the counter 317 to determine when, ahead of the timer 319 interval, to check the core 320 whether at initialization/boot up or during on-going operation. For example, the counter 317 may be set for a time period that is a percentage of the timer 319 interval, such as 80% of the timer 319 interval. When the counter 317 reaches the appropriate time ahead of the triggering or expiration of the timer 319, the counter 317 causes the monitor module 316 to wake up and/or perform a check or test of the status of the core 320. Such test or check of the status may be by causing the monitor module 316 to send a query to the core 320, causing the monitor module 316 to look for an automatic message from the core 320 (or from some other location), or by some other desired method or means. Thus, regardless of the interval of the timer 319, and regardless of whether the interval changes randomly or by design, such embodiments of the monitor module 316 may receive a flag or trigger, or may wake up to check/test the status of the core 320 before the timer 319 triggers or expires. In other embodiments, a separate counter 317 may not be implemented, while in yet other embodiments, the counter 317 may be an additional timer.

The intervention of the monitor module 316 in the initialization/boot up and/or operation of the core 320 may be an automatic and/or hardwired instruction to reboot the core 320 or SoC IC 302 at any instance of the timer 319 expiring. In such embodiments, any attempt by an OEM manufacturer, an end user, or a third party to circumvent the monitor module 316 by preventing initialization/boot up of the monitor module 316 results in the core 320 and/or SoC IC 302 continually reinitializing/rebooting until the monitor module 316 is properly booted and running.

Similarly, any attempt to change the core 320 during initialization/boot up or operation in an undesired manner, such as by insertion of malware, also causes the monitor module 316 to reboot the core 320 and/or SoC IC 302, assisting with removing or preventing installation of the undesired malware to the core 320 (or from the core 320 to the monitor module 316). In this manner, the present systems 200/300 provide robust security for the SoC IC 202/302 itself, without reliance on outside systems or components (such as monitoring by a remote computer system), while minimizing the power drain and/or physical SoC IC 202/303 chip area for the security features.

In other implementations, the intervention of the monitor module 316 in the boot up and/or operation of the core 320 may be more complex than an automatic reboot of the core 320 or SOC IC 302, and may vary based on any desired policies, operational parameters, security states, etc. For example, in an enterprise setting, where the PCD is one of many PCDs issued to employees of the enterprise, it may be desirable to only limit some functionality of the core 320 or other component of the SoC IC 302 in the event of a problem with the core 320, depending upon the type of problem the monitor module 316 detects in the core 320. In such implementations for example, if the monitor module 316 detects that media content without the proper digital rights management (DRM) is attempting to be played on the PCD using the core 320, instead of rebooting the core 320 after the timer 319 is triggered, the monitor module 316 may simply disable and/or prevent the core 320 from accessing the video encoder 334.

Continuing this example, in the event of detection by the monitor module 316 of certain types of pre-defined issues with the core 320, the enterprise may desire that its PCD users still have access to e-mails and/or the ability to make telephone calls. As illustrated in FIG. 3, in such an implementation, in the event that the timer 319 is triggered or expires, the monitor module 316 may not cause the core 320 to reinitialize/reboot, but instead may disable and/or prevent the core 320 and/or other cores from accessing various components, such as the USB controller 340, network card 314, modem device/RF transceiver 368, video encoder 334 and/or other components of the SoC IC 302 or PCD except to make or receive cellular calls or read emails.

Thus, in addition to or instead of causing the core 320 to reboot, the monitor module 316 may take or cause any action desired upon expiration of the timer 319. Such actions the monitor module 316 may take, include, but are not limited to: prevent the core 320 and/or end user from accessing certain materials, files, or data stored on the PCD such as photos, emails, text messages, enterprise passwords or keys; disable or prevent the core 320 access to various components of the SoC IC 302 and/or PCD including communications peripherals such as the modem, wife, or Bluetooth connectivity, sensors such as an accelerometer, or a GPS receiver; cause the CPU 110 or portions/cores 120, 122, 124 of the CPU 110 to run slower; cause battery management to end resulting in poor battery life; keep log entries of events causing the timer 319 to trigger and/or reporting such log entries to remote servers or web sites (such as enterprise servers); send a warning to an end user such as a pop up dialog/warning to which the end user must respond; and/or demand or take control of certain components from the core 320 such as a camera 148 (see FIG. 1) to use for facial recognition or a network card 314 to use to report events directly to a remote destination.

Moreover, the monitor module 316 may be configured such that responses to a triggering of the timer 319 are tiered. For example, for an expiration of the timer 319 due to a certain type of problem with/related to the core 320 the monitor module 316 may take one action. While, for a different type of problem with with/related to the core 320, the monitor module 316 may take a different and/or more severe action. The action by the monitor module 316, including a tier of responses, may in some embodiments depend on or vary according to any desired factor or parameter, such as the number of times the timer 319 expires. In such embodiments, the monitor module 316 may take a less severe (or no) action in response to a first triggering/expiration of the timer 319 and take different and/or more severe actions for a second, third, fourth, etc. subsequent expiration of the timer 319.

In other embodiments, the action taken by the monitor module 316 (including the length of the time interval between checks/tests of the status of the core 320) or the response to a triggering of the timer 319 may be based on a policy system and/or a security level or state for the PCD. FIG. 4 illustrates one embodiment of some exemplary states under which the systems of FIG. 2 and/or FIG. 3 may operate. As shown in FIG. 4, the monitor module 216/316 may operate in some embodiments under/in accordance with a series of security level states for the PCD. Such security level states may be applied as desired to provide rules for when and how the monitor module 216/316 monitors the ongoing activities and/or status of the core 220/320 after boot up.

In the embodiment illustrated in FIG. 4, such security level states may be implemented in or by the monitor module 216/316 after a successful initialization/boot up that ensures a proper operation of the monitor module 216/316. In various embodiments, such security level states may be set or selected by an end user of the PCD, an IT department of the enterprise issuing the PCD to the end user, or by a manufacturer based on the type of device/use to which the device will be put. Additionally, the exemplary security level states may be changed as desired, including automatically in response to any desired parameter, event, or factor, including a triggering or expiring of the timer 219/319.

FIG. 4 shows four exemplary security level states the first of which is a minimum security state 405. This state provides the least security of the states illustrated in FIG. 4. The minimum security state 405 may include longer intervals for the timer 219/319, resulting in longer intervals between checks or tests of the core 220/320 by the monitor module 216/316. Additionally, the minimum security state 405 may result in less severe actions by the monitor module 216/316 if the timer 219/319 expires.

For example, in one embodiment the monitor module 216/316 may take no action at all on a first expiration/triggering of the timer 219/319, and may instead only take action after a second or more subsequent triggering of the timer 219/319. In some implementations, the monitor module 216/319 may keep track of the number/type/timing/etc. of multiple triggers of the timer 219/319 by any desired means, such as by logging the events in a memory or tracking the events with a counter such as the counter 317 of the monitor module 316 of FIG. 3. Additionally, the minimum security state 405 may cause the monitor module 216/316 to take minimally disruptive actions in the event of a timer 219/319 trigger. Such action could include in some embodiments logging the event to a file (either locally or remotely) and/or displaying a message to the end user of the PCD.

Another exemplary security level state may be a DRM state 410 as illustrated in FIG. 4. In some embodiments, such a DRM state 410 may be implemented whenever the video encoder 134 (see FIG. 1) or other component of the SoC IC 202/303 or PCD determines that a media file (such as an audio file or video file) is being played or displayed on the PCD or is about to be played/displayed on the PCD. In other embodiments, such a DRM state 410 may be implemented whenever the timer 219/319 triggers and the monitor module 216/316 determines that a media file is being played/displayed, or that displaying/playing the media file resulted in the timer 219/319 trigger.

In the illustrated DRM state 410 of FIG. 4, the timer 219/319 operates on a medium length time interval, but may operate on any length desired. Additionally, in the illustrated DRM state 410, the monitor module 216/316 takes action when the timer 219/319 expires and the PCD is attempting to play media. In some embodiments the media may not have the appropriate DRM protections, or the end user may be attempting to use the PCD to overcome or avoid DRM protections on the media. In such embodiments, the monitor module 316' may act to prevent any operation of one or more of the audio encoder or visual encoder 334 by a core such as core 320 (see FIG. 3). In other embodiments, the monitor module 316 may act to only prevent operation of one or more of the audio encoder or visual encoder 334 by a core such as core 320 (see FIG. 3) for only selected media files and/or types of media files.

As shown in FIG. 4, other increased levels of security state are also possible in various embodiments. For example, FIG. 4 illustrates a medium security state 415 that may be designed or configured to provide more robust security and/or enable more invasive actions by the monitor module 216/316 than the previously-discussed minimum security state 405. The exemplary medium security state 415 provides for medium timer 219/319 interval lengths, but any desired interval length may be implemented.

Additionally, in the medium security state 415 of FIG. 4, the monitor module 216/316 takes action any time the timer 219/319 expires. For example, in response to the timer 319 expiring the monitor module 316 may disable access by the core 320 to one or more peripherals such as a USB controller 340, network card 314, modem device/RF transceiver 368 and/or video encoder 334 (see FIG. 3).

In some embodiments, a single expiration of the timer 319 may cause the monitor module 316 to disable access for all of the peripherals. In other embodiments, a first trigger or expiration of the timer 319 may result in the core 320 not being able to access the USB controller 340 (see FIG. 3), while a second or other subsequent trigger of the timer 319 may result in the core 320 not being able to access one or more additional peripherals. The order of the peripherals and/or number of peripherals disabled by the monitor module 316 per expiration of the timer 319 may vary as desired in different embodiments.

Alternatively, or additionally, in some embodiments of the medium security state 415, the monitor module 316 may also send a log or report to a remote server, such as a website or enterprise server if the PCD is part of an enterprise system. The monitor module 316 may cause such log or report to be sent by requiring the core 320 or SoC IC 302 to turn over control of the interfaces/drivers/etc. necessary for such communication to the monitor module 316 (or a monitor CPU 217 in the case of the monitor module 216 of FIG. 2), or by any other desired means.

Finally, FIG. 4 illustrates a fourth, maximum security state 420 that may implemented when even more security for the SoC IC 202/303 is desired, as decided by an end user, enterprise IT personnel, or pre-set by an OEM manufacturer in various embodiments. In some implementations, the maximum security state 420 may be a default setting for the monitor module 216/316. The maximum security state 420 may include, or may be configured with short timer 219/319 intervals leading to more frequent checks or tests of the status of the core 220/320.

In response to any trigger of the timer 219/319, the monitor module 216/316 in the maximum security state 420 may automatically reinitialize/reboot the core 220/320 and/or the entire SoC IC 202/303 in various implementations. As with the medium security state 415, in some embodiments of the maximum security state 420 the monitor module 316 may also send a log or report to a remote server, such as a website or enterprise server if the PCD is part of an enterprise system. The monitor module 316 may cause such log or report to be sent by requiring the core 320 to turn over control of the interfaces/drivers/etc. necessary for such communication to the monitor module 316 (or a monitor CPU 217 in the case of the monitor module 216 of FIG. 2), or by any other desired means.

It is to be understood that while FIG. 4 illustrates only four different security level states, other embodiments may have fewer or more security level states. Similarly, various embodiments may have different and/or different kinds of security level states from those illustrated in FIG. 4. For example, other embodiments may have more, fewer, or different event-based security level states, such as the DRM state 410 shown in FIG. 4. Additionally, the number and/or types of security level states available to the monitor module 216/316 may vary over time. For instance, the number and/or types of security level states may be selected and/or changed by an end user at varying times as desired, or may be selected and/or changed by enterprise IT personnel at various times in communication with the monitor module 216/316. Further, instead of or in addition to the security states as illustrated in FIG. 4, varying levels or types of security may be implemented as policies and/or sets of rules or algorithms as desired.

Figure 5A:
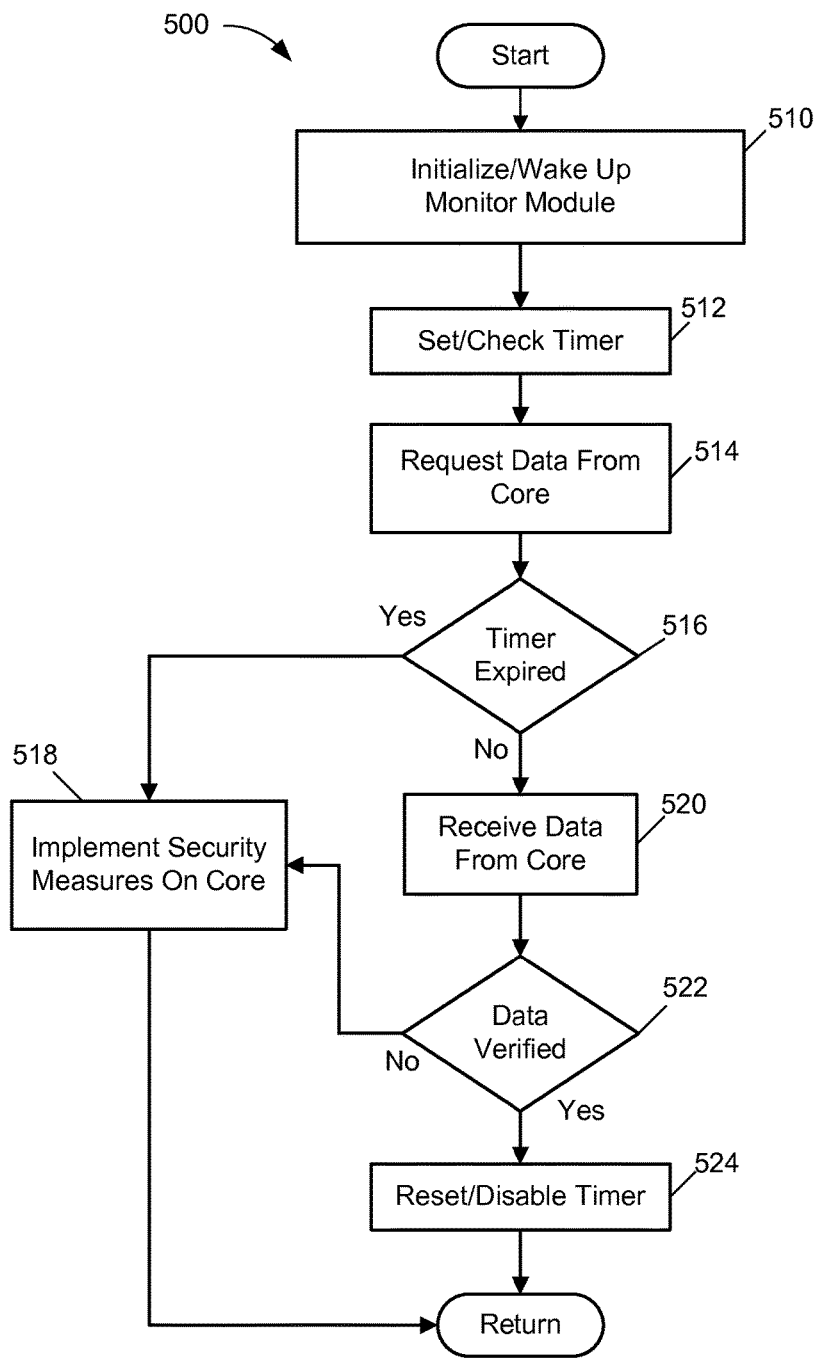
FIG. 5A is a flowchart describing aspects of an exemplary embodiment of a method for providing improved security for one or more processors in a PCD.

Turning to FIG. 5A, a flowchart describing an exemplary embodiment of a method for improved security for one or more processors or cores in a PCD is illustrated. The method 500 begins with block 510 where a monitor module (such as monitor module 216 in FIG. 2 or 316 in FIG. 3) is initialized. In some embodiments the initialization in block 510 may comprise an initialization such as from a complete power down of the SoC IC 202/302 and/or the PCD. One example of such an initialization/boot up is when the PCD or SoC IC 202/302 is powering up from a complete battery drain. In other embodiments the initialization in block 510 may instead comprise a "wake up" from a temporary power reduction of the monitor module 216/316. An example of such a "wake up" is the monitor module 216/316 waking up/power up from a power saving idle or sleep mode of just the monitor module 216/316.

Upon initializing/waking up, the monitor module 216/316 sets or checks the timer 219/319 in block 512. In some embodiments, the timer 219/319 has been previously set, and in block 512 the monitor module 216/316 wakes up and checks the timer 219/319. In other embodiments, the monitor module 216/316 is initializing/booting up, and the monitor module 216/316 in block 512 may set the monitor timer 219 to a time interval within which the core 220/320 should provide the proper code to allow the monitor module 216/316 to initialize/boot up, for the core 220/320 to respond to a request for any code needed for the monitor module 216/316 to initialize/boot up, or for any other action needed to ensure a proper initialization/boot up by the monitor module 216/316.

Using the system 200 of FIG. 2 as an example, the monitor module 216 may request or attempt to load the monitor boot code 225a in block 512. This request/loading of block 512 may be accomplished by the monitor CPU 217 of the monitor module 216 illustrated in FIG. 2. As discussed above, in order to minimize monitor module's 216 power consumption and/or the chip area of the SoC 202 required for the monitor module 216, some embodiments of the monitor module 216 may have limited on-board or dedicated memory, such as monitor memory 218 in FIG. 2.

In such embodiments, the code 225a needed for the monitor module 216 to fully initialize/boot up may be located apart from the monitor module 216 and may be provided to the monitor module 216 to allow it to initialize/boot up. Using the exemplary system 200 of FIG. 2 as an example, the memory 223 in FIG. 2 may be a flash memory in which the monitor boot code 225a is stored. When the monitor module 216 begins to initialize/boot up in accordance with the method 500, the CPU 221 of the core 220 may in some embodiments retrieve the boot code 225a from the memory 223 and communicate the boot code 225a to the CPU 217 of the monitor module 216 in block 512.

Continuing the above example, the method 500 in block 516 checks to see if the timer 219 has expired/triggered as a result for example of the core 220 not promptly providing the monitor boot code 225a and/or not timely responding to a request from the monitor module 216 for the monitor boot code 225a. As discussed above, the timer 219 may be internal to the monitor module 216 as illustrated in FIG. 2. In other embodiments the timing function may be performed by multiple components, and/or by one or more components external to the monitor module 316, such as the internal counter 317 and external timer 319 of the system 300 illustrated in FIG. 3.

The determination of block 516 may be made by a component, such as the monitor module 216/316 (or the CPU 217 of the monitor module 216) evaluating the timer 219/319 to see if it has expired/triggered due to the passing of the time interval. In other embodiments, the determination of block 516 may be a result of the timer 219/319 automatically sending some signal or communication when the timer 219/319 expires/triggers due to the passing of the timer interval. Regardless of how implemented, the timer 219/319 may not be reset by the core 220/320 (or by other processor or core which the monitor module 216/316 monitors).

Thus, unless the core 220/320 acts in accordance with the expectations or requirements of the monitor module 216/316, the timer 219/319 will have expired in block 516 of the method 500 before the data/boot code is received in block 520. If the timer 219/319 has expired, the method of FIG. 5A implements security measures in block 518. For the example of an initialization of the monitor module 216, the security measures may be an automatic restart/reinitialization of the SoC 202, which would result in the method 500 starting over.

In other embodiments, the security measures that may be taken as a result of the expiration or triggering of the timer 219 include, but are not limited to: prevent the core 220 and/or end user from accessing certain materials, files, or data stored on the PCD such as photos, emails, text messages, enterprise passwords or keys; disable or prevent the core 220 from accessing various components of the SoC IC 202 and/or PCD including communications peripherals such as the modem, wi-fi, or Bluetooth connectivity, sensors such as an accelerometer, or a GPS receiver; cause the CPU 110 or portions/cores 120, 122, 124 of the CPU 110 to run slower; cause battery management to end resulting in poor battery life; keep log entries of events causing the timer 219 to trigger and/or reporting such log entries to remote servers or web sites (such as enterprise servers); send a warning to an end user such as a pop up dialog/warning to which the end user must respond; and/or demand or take control of certain components from the core 220 such as a camera 148 (see FIG. 1) to use for facial recognition or a network card 314 to use to report events directly to a remote destination. Such security measures may be implemented as part of a security policy and/or include various security levels as discussed above with respect to FIG. 4.

If the timer 219 has not expired in block 516, the method 500 continues to block 522, where in the example of an initialization of the monitor module 216, the monitor boot code 225a is verified to ensure that the monitor module 216 properly initializes/boots in a manner to allow it to monitor the core 220 and/or other components of the SoC 202. Such verification may be accomplished in various embodiments with digital signatures, keys, etc. and/or by the monitor CPU 217 checking a digital signature, key, etc. of the provided monitor boot code 225a with one or more values stored in the monitor memory 218, or may be accomplished by any code verification means desired.

If the monitor boot code 225 is not properly verified in block 522, such as by providing a tampered with version of the monitor boot code 225a in an effort to circumvent the monitor module 216 security measures, security measures are implemented in block 518 as discussed above. Note that in some embodiments the actual security measure implemented in block 518 triggered by a lack of data verification in block 522 may differ than the security measure that would be implemented if the triggering event is the timer expiring in block 516. In other embodiments the same security measure may be implemented in block 518 regardless of the triggering event.

If the data is verified in block 522, the timer 219 is reset or disabled by the monitor module 216 in block 524. By resetting or disabling the timer 219 in block 524 the embodiment of the method 500 of FIG. 5A allows the core 220 and/or SoC 202 to continue operating, and the monitoring module 216 may continue to monitor one or more components of the SoC 202.

For example, after a proper initialization of the monitor module 216/316 in accordance with the method 500, the timer 219/319 may be set for a predetermined time period in block 524 and the monitor module 216/316 may be placed into reduced power state or mode, such as an idle mode or sleep mode (or may be shut down) until the next desired monitoring event.

In such a "wake up" embodiment, the monitor module 216/316 may be awakened in block 510. The monitor module 216/316 may be awakened by a trigger, such as from counter like counter 317 in FIG. 3, or by any other desired means. In a "wake up" implementation the method 500, the monitor module 216/316 may optionally check the previously set (or may set) timer 219/319 in block 512 before requesting data from a core 220/320 in block 514 as discussed above. In some embodiments the monitor module 216/316 may be awakened in block 510 after the expiration of the timer 219/319 such that the timer 219/319 may be reset in block 512. In other embodiments, the monitor module 216/316 may be awakened in block 510 at a predetermined time before the timer 219/319 is set to expire as discussed above, there the predetermined time is sufficient to allow the monitor module 216/316 to perform the desired monitoring before the timer 219/319 is set to expire.

Regardless of whether the timer 219/319 is checked in block 512, the monitor module 216/316 requests a response and/or data from one or more cores 220/320 of the SoC IC 202/302 in block 514. As discussed above if the requested response and/or data is not received from the core 220/320 in block 520 before the timer expires/is triggered in block 516, the monitor module 216/316 implements one or more security measures on the core 220/320 in block 518. Such security measures may include any such measures discussed above implemented in any manner discussed above, including taking no action at all or causing the SoC 202/302 to re-initialize/reboot.

Continuing the "wake up" example of the method 500, if the requested response or information is received from the core 220/320 in block 520 before the timer expires/is triggered in block 516, the monitor module 216/316 may optionally verify the data in block 522. However, in some embodiments, after a secure and proper initial boot up, it may not be desirable or necessary to verify the received data or response from the core 220/320 as illustrated in block 522.

Regardless of whether the data is verified in block 522, in the "wake up" example, if the requested response and/or information is received from the core 220/320 in block 520 before the timer expires/is triggered in block 516, the monitor module 216/316 disabled the timer 219/319, or resets the timer 219/319 in block 524 such as to a predetermined time interval for the next monitoring event by the monitoring module 216/319.

As would be understood by one of ordinary skill in the art, FIG. 5A describes only one exemplary embodiment of a method for improved security for a processor or core in a PCD. In other embodiments, additional blocks or steps may be added to the method 500. Similarly, in some embodiments various blocks or steps shown in FIG. 5A may be combined or omitted, such as for example combining blocks 520 and 522 into one receiving/verifying step rather than the two separate blocks/steps illustrated in FIG. 5A. Such variations of the method 500 are within the scope of this disclosure.

Additionally, certain steps in the processes or process flows described in this specification, including FIG. 5A, may naturally precede others for the invention to function in the embodiments as described. However, the invention is not limited to the order of the steps described if such order or sequence does not alter the functionality of the invention, such as for example performing block 522 before block 516. Moreover, it is recognized that some steps may performed before, after, or in parallel (substantially simultaneously) with other steps without departing from the scope of the disclosure. In some instances, certain steps may be omitted or not performed without departing from the invention, such as for example removing blocks 512 (the first checking of the timer 219/319 in a "wake up" mode of operation) and/or 522 (verifying the received response/data in a "wake up" mode of operation). Such variations of the method 500 are within the scope of this disclosure. Further, words such as "thereafter", "then", "next", "subsequently", etc. are not intended to limit the order of the steps. These words are simply used to guide the reader through the description of the exemplary method.

Figure 6A:
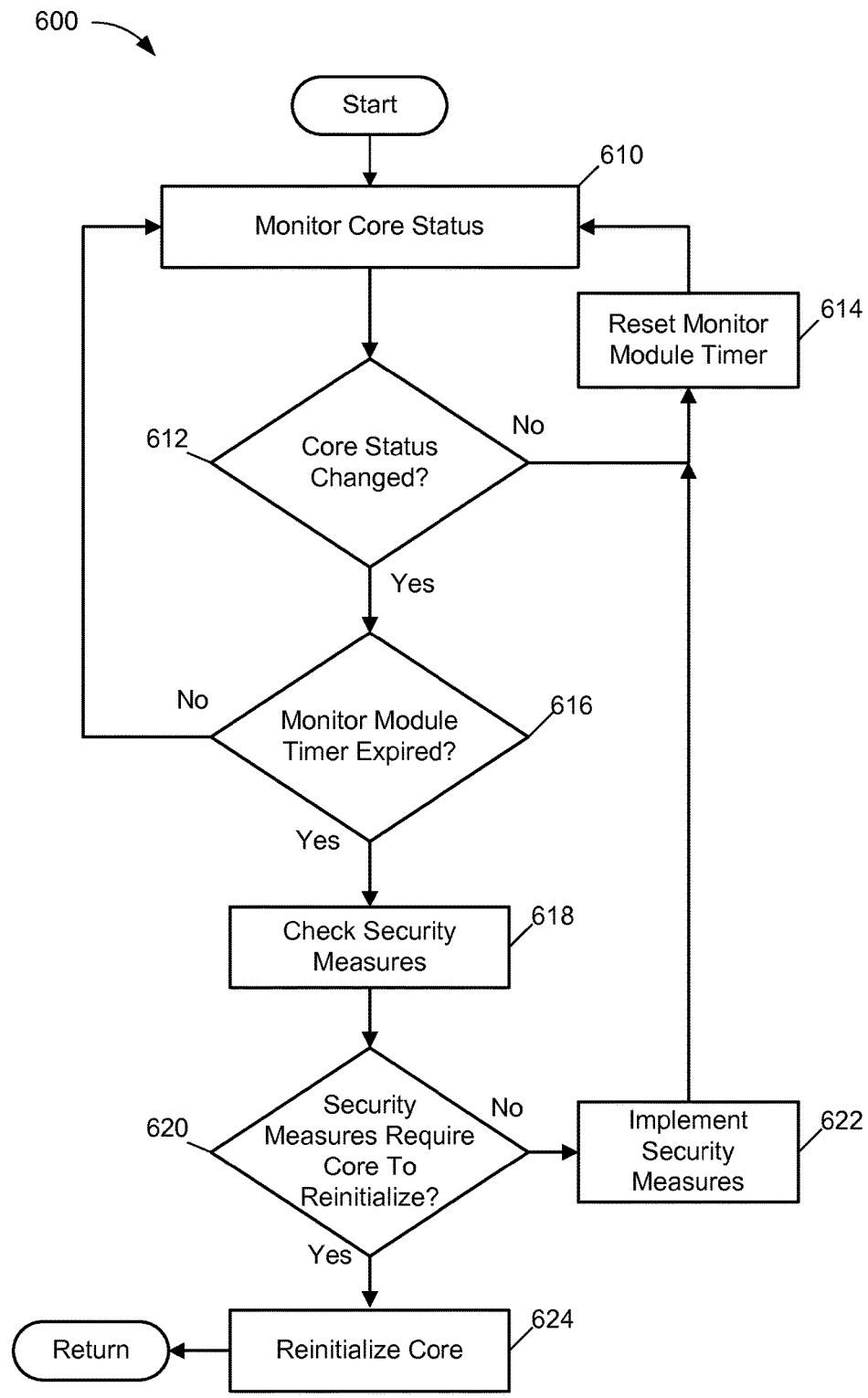
FIG. 6A is a flowchart describing additional aspects of an exemplary implementation of a method for providing improved security for one or more processors in a PCD.

Turning to FIG. 6A, a flowchart describing additional aspects of an exemplary implementation of a method for providing improved security for one or more processors or cores in a PCD is shown. In the exemplary method 600 illustrated in FIG. 6A, after assuring a proper initialization/boot up of the monitor module 216/316, such as in accordance with the method 500 of FIG. 5A, the method 600 in block 610 monitors the status of one or more cores, such as core 220 (FIG. 2)/320 (FIG. 3A). Monitoring the status of the core 220/320 of block 610 may include in some embodiments checking the status of the core 220/320, such as by checking or testing whether the code for the core 220/320 has been changed since boot up and/or since the last check/test.

The monitor module 216/316 may perform this check or test, such as by the CPU 217 of the monitor module 216 of FIG. 2 receiving a communication from the CPU 221 of the core 220. Such communication from the core 220 may be initiated by the core 220 as part of the security measures, policy, or state as discussed above. In some embodiments, the communication may be a response by the core 220 to a request or demand from the monitor module 216. The information communicated from the core 220 in such embodiments may include a digital signature, key, or other token by or from which it may be determined whether the code for the core 220 has been altered from a previous version of the core 220.

In other embodiments, monitoring the status of the core 220/320 in block 610 may also comprise monitoring the actions of the core 220/320, such as receiving information about activities that the core 220/320 is performing or is about to perform. One example of such an embodiment would be from the discussion of FIGS. 3A and 4 above where the core 220/320 may be operating the video encoder 334, or causing another processor, such as a GPU to operate the video encoder 334. In such an implementation, monitoring the status of the core 220/320 may include noting the operation of or attempt to operate the video encoder 334 as well as the number, type, details, etc. of the media to be played on the video encoder 334, such as whether DRM protections are being observed.

Again, continuing with the above example discussed for FIGS. 3 and 4 of media playing on the video encoder 334, in some embodiments, the monitor module 316 may perform the check or test of the status of the 320 operation of the video encoder 334. This monitoring or checking of the status may be accomplished by the monitor module 316 of FIG. 3 receiving a communication from the core 320. Such communication from the core 320 may be initiated by the core 320 as part of the security rules, policy, or states as discussed above. Alternatively, in some embodiments the communication may be a response by the core 320 to a request or demand from the monitor module 316. The information in the communication may be any information desired, or requested by the monitor module 316 to allow a determination whether the core 320 is operating in accordance with the security policy and/or in a manner expected by the monitor module 320.

In yet other embodiments, monitoring the status of the core 220/320 in block 610 may comprise noting whether or not the monitor module 216/316 is allowed to communicate with other components. One example of such an embodiment would be whether or not the monitor module 216/316 was allowed to communicate with a remote computer, such as an enterprise server communicating regularly scheduled updates to the monitor module 216/316 and/or the monitor module 216/316 querying the remote computer/enterprise server for rules, policies, and/or security level state updates. In such an implementation, monitoring the status of the core 220/320 may include noting whether or not the core 220/320 allows the communications and/or relinquishes control of the necessary SoC IC 202/302 components for the monitor module 216/316 to effect such communications and/or to receive communications initiated from or sent by the remote computer.

Depending on the uses to which the PCD is put, the desires of the end user, and/or the desires of an authorized third party (such as an enterprise system of which the PCD may be a part), the particular monitoring of block 610 may vary in some implementations. For example, a first security policy or security level state (such as one of the states illustrated in FIG. 4) may be in place when the method 600 performs a first monitoring/testing of block 610, resulting in the first monitoring/testing being performed in a particular way and/or of particular information about the core 220/320. However, at a second time the method 600 performs the monitoring of block 610, a second security policy or security level state (such as a different one of the states illustrated in FIG. 4) may be in place, resulting in the second monitoring being performed in a different way from the first monitoring and/or of different information about the core 220/320 than the first monitoring.

The exemplary method 600 then determines whether the status of the core 320 has changed in block 612. The determination in block 612 may depend on the type of monitoring and/or the way the monitoring of block 610 was performed. Using the example of the monitoring the status of the core 220 of block 610 comprising monitoring changes in the code for the core 220 since boot up, the determination in block 612 may be the CPU 217 of the monitor module 216 comparing the received digital signature, key, token, etc. with a value stored in the monitor memory 218 to determine whether the core 220 code has changed.

Regardless of how the determination is made in block 612, if the determination is that the core 220/320 is operating properly—for example has not been tampered with such that the status changed since boot up—the timer 219/319 is reset for some time interval in block 614 and the method 600 returns to block 610 to continue monitoring the status of the core 220/320. By resetting the timer 219/319 rather than allowing the timer 219/319 to trigger/expire, the method 600 prevents the implementations of security measures against the core 220/320 (such as reinitializing/rebooting the core 220/320 or SoC IC 202/302) when the core 220/320 is operating properly and/or running the appropriate code.

As discussed above, the timer 219/319 may not be reset by the core 220/320 or other components of the SoC IC 202/302, but may only be reset by the monitor module 216/316. Additionally, it is not necessary that the timer 219/319 always be reset to a fixed time interval. In some embodiments, the time interval to which the timer 219/319 is reset may vary, and may in some implementations be random. When the time interval varies, the length of the time interval may be based on any factor or consideration desired, including a security policy and/or security level state (such as the security level states illustrated in FIG. 4).

Further, for some implementations, such as the system 200 illustrated in FIG. 2, resetting the timing function may further comprise resetting both the timer 219 as well as resetting the internal counter 217 of monitor module 216. As discussed above, implementing and resetting such an internal counter 217 may allow the method 600 to ensure that monitoring module 216/316 is awakened and/or the next monitoring of the status of the core 220/320 at block 610 is performed sufficiently ahead of the expiration/triggering of the timer 219/319 to make such monitoring useful for the method 600.

If the determination in block 612 is that the core 220/320 is not operating properly—for example it has been improperly tampered with or changed since boot up—the method 600 of FIG. 6A determines whether the timer 219/319 has expired in block 616. The determination of block 616 may be made by a component, such as the monitor module 216/316 (or the CPU 217 of the monitor module 216) evaluating the timer 219/319 to see if it has expired/triggered due to the passing of the time interval. In other embodiments, the determination of block 616 may be a result of the timer 219/319 automatically sending some signal or communication when the timer 219/319 expires/triggers due to the passing of the timer interval.

As illustrated in FIG. 6A regardless of how made, if the determination in block 616 is that the timer 219/319 has not expired, the method 600 returns to block 610 and monitors the core 220/320. Additionally, in some implementations, rather than return immediately from block 616 to block 610 to continuously monitor the core 220/320 status, the method 600 may instead in block 616 cause the monitor module 216/316 to power down or enter a sleep or idle mode for a specified period time to reduce power consumption. In such embodiments, returning to block 610 of the method may include waking up the monitor module 216/316 in block 610 similar to the discussion of a "wake up" mode for FIG. 5A above.

Note that in some embodiments, such as the system 200 with the counter 217 in the monitor module 216 of FIG. 2, the time interval of the counter 217 may ensure that the monitoring of block 610 of the method 600 takes place just before the timer 219 is set to expire/trigger. In such implementations, after determining that the status of the core 220 has changed in block 612, the method may also be able to immediately make the determination that the timer 219 has expired in block 616.

In other implementations, even if the determination of block 612 is that the status of the 220/320 has changed, the determination at block 616 may be that the timer 219/319 has not expired such that the method returns to monitoring the status of the core 220/320 at block 610. In this manner, more than one "cycle" of monitoring is possible before the timer 219/319 is due to expire in some embodiments. In such embodiments of the method 600, it may be possible to "cure" a defect in the core 220/320 and/or the operation of the core 220/320 determined in block 612 before the timer 219/319 expires and the core 220/320 reboots (or before some other security measure is implemented).

If, on the other hand, the determination in block 616 is that the timer 219/319 has expired or triggered, the method 600 checks the security measures in block 618. The security measures that may be taken as a result of the expiration or triggering of the timer 219/319 include, but are not limited to: prevent the core 220/320 and/or end user from accessing certain materials, files, or data stored on the PCD such as photos, emails, text messages, enterprise passwords or keys; disable or prevent the core 220/320 from accessing various components of the SoC IC 202/302 and/or PCD including communications peripherals such as the modem, wife, or Bluetooth connectivity, sensors such as an accelerometer, or a GPS receiver; cause the CPU 110 or portions/cores 120, 122, 124 of the CPU 110 to run slower; cause battery management to end resulting in poor battery life; keep log entries of events causing the timer 219/319 to trigger and/or reporting such log entries to remote servers or web sites (such as enterprise servers); send a warning to an end user such as a pop up dialog/warning to which the end user must respond; and/or demand or take control of certain components from the core 220/320 such as a camera 148 (see FIG. 1) to use for facial recognition or a network card 314 to use to report events directly to a remote destination.

Checking the security measures in block 618 may also include checking what security measure(s) are available under the circumstances. The security measure(s) available may depend on any desired factor or parameter in some embodiments. For example, as discussed above, the expiration or triggering of the timer 219/319 due to a certain type of failing by/problem with the core 220/320 may require one type of security measure. On the other hand, a different type of failing by/problem with the core 220/320 may require a different type or and/or more severe security measure. Additionally, the security measure(s) available may depend on, or vary, according to the number of times the timer 219/319 is triggered. In such embodiments, a first, less severe (or no) security measure my be available in response to a first expiration or triggering of the timer 219/319, while a different and/or more severe security measure may be available for a second, third, fourth, etc. subsequent expiration or triggering of the timer 219/319.

Moreover, in some embodiments checking the security measures in block 618 may also include checking for the security measures available/required for any applicable security policy and/or security level or state in effect, keeping in mind that such security policies, levels, states may vary or change over time. For example, in such embodiments, various security level states, such as those illustrated in FIG. 4 may be in place for the PCD. Thus, checking the security measures in block 618 may also include determining what security measures are available and/or mandated by the security level state in effect at that time (if any) and under the circumstances of the timer 219/319 trigger or expiration.

As illustrated in FIG. 6A, the method 600 determines in block 620 whether or not the security measures require a reinitialization/reboot of the core 220/320 and/or SoC IC 202/302. If such reboot is required, the method 600 concludes by reinitializing the core 202/320 (and/or SoC IC 202/302 as desired) in block 624 and returning to the beginning of method 500 of FIG. 5A to start the core 220/300 (and or SoC 202/302) initialization/boot process.

On the other hand, if such reboot is not required the method 600 implements the required security measure in block 622, returns to block 614 discussed above where the timer 219/319 is reset, and returns to block 610 above where the status of the core 220/320 is monitored, either continuously or intermittently (such as with a sleep or idle mode as discussed).

As would be understood by one of ordinary skill in the art, FIG. 6A describes only one exemplary embodiment of a method for improved security for a processor or core in a PCD. In other embodiments, additional blocks or steps may be added to the method 600 illustrated in FIG. 6A. Similarly, in some embodiments various blocks or steps shown in FIG. 6A may be combined or omitted, such as for example combining blocks 618 and 620 into one checking/determining step rather than the two separate blocks/steps illustrated in FIG. 6A. Such variations of the method 600 are within the scope of this disclosure.

Additionally, certain steps in the processes or process flows described in this specification, including FIG. 6A, may naturally precede others for the invention to function in the embodiments as described. However, the disclosure is not limited to the order of the steps described if such order or sequence does not alter the functionality of the invention. Moreover, it is recognized that some steps may performed before, after, or in parallel (substantially simultaneously) with other steps without departing from the scope of the disclosure. In some instances, certain steps may be omitted or not performed without departing from the invention. Such variations of the method 600 are within the scope of this disclosure. Further, words such as "thereafter", "then", "next", "subsequently", etc. are not intended to limit the order of the steps. These words are simply used to guide the reader through the description of the exemplary method.

Figure 5B:
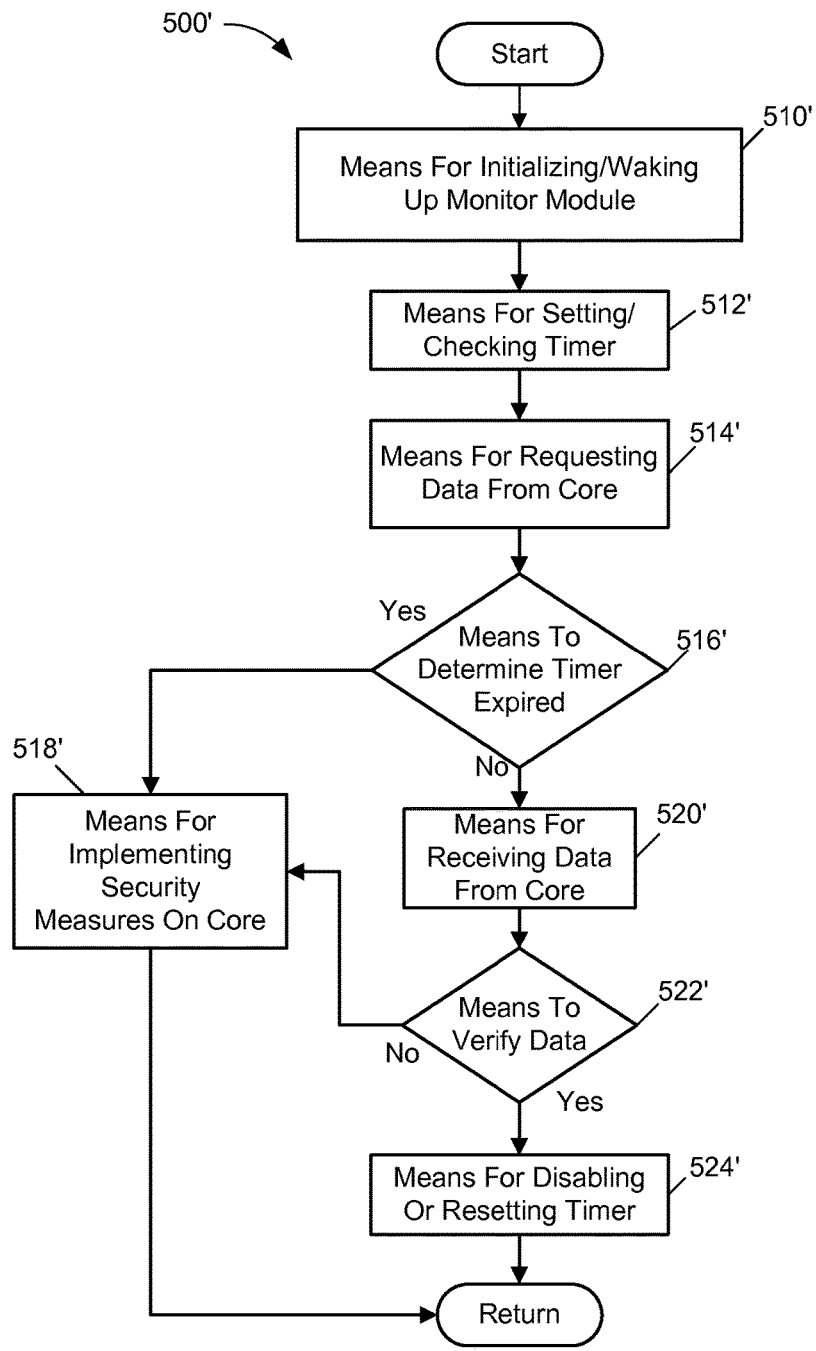
FIG. 5B illustrates example components capable of performing the aspects of the method illustrated in FIG. 5A
Figure 6B:
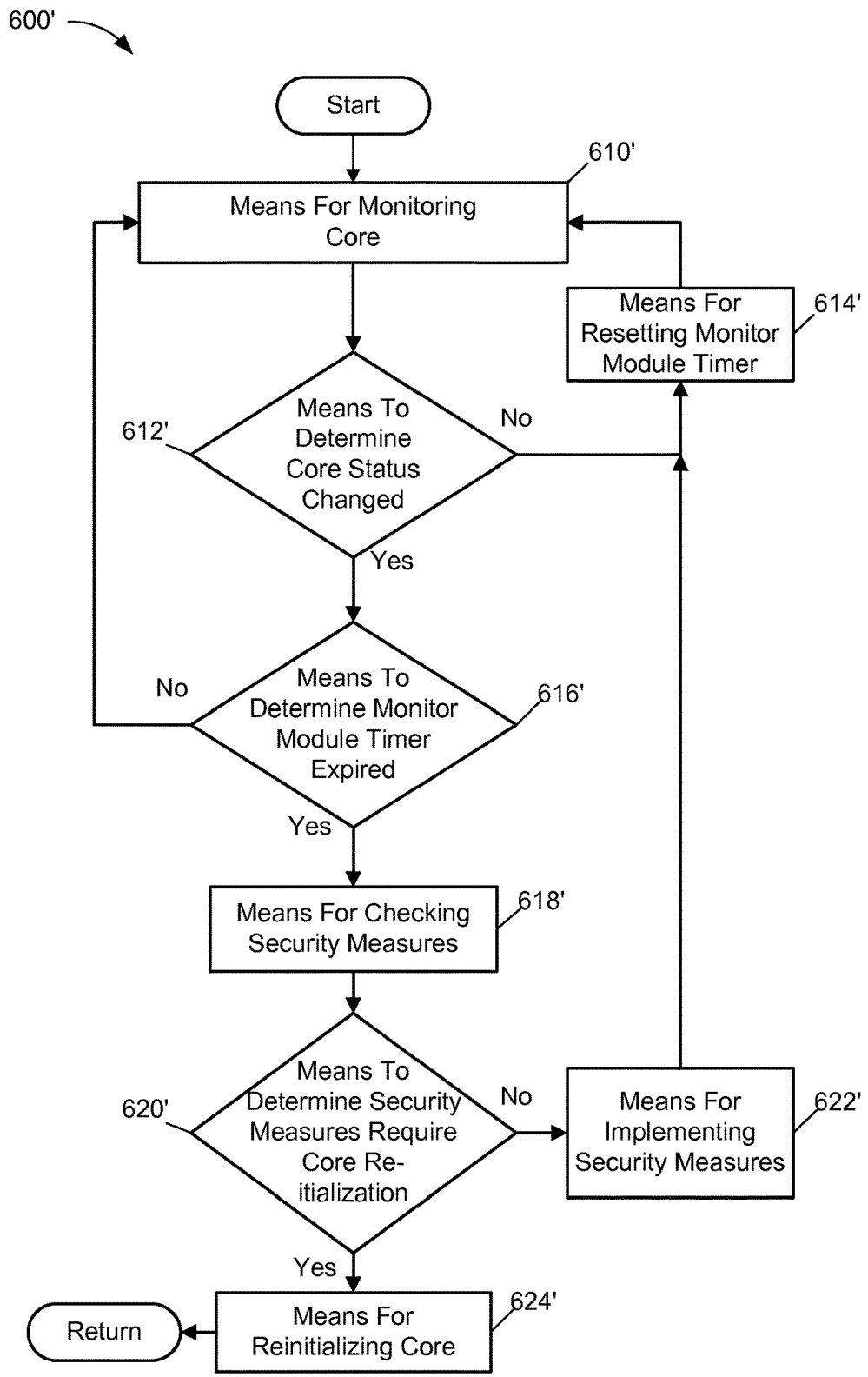
FIG. 6B illustrates example components capable of performing the aspects of the method illustrated in FIG. 6A.

The various operations, methods, or functions described above for both methods 500 and 600 may be performed by various hardware and/or software component(s)/module(s). Such component(s) and/or module(s) may provide the means to perform the various described operations, methods, or functions. Generally, where there are methods illustrated in Figures having corresponding counterpart means-plus-function Figures, the operation blocks correspond to means-plus-function blocks with similar numbering. For example, blocks 510-524 illustrated in FIG. 5A correspond to means-plus-function blocks 510'-524' illustrated in FIG. 5B. Similarly, blocks 610-624 illustrated in FIG. 6A correspond to means-plus-function blocks 610'-624' illustrated in FIG. 6B.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed processor-enabled processes is explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored on or transmitted as one or more instructions or code on a computer-readable medium, such as a non-transitory processor-readable medium. Computer-readable media include both data storage media and communication media including any medium that facilitates transfer of a program from one location to another.

A storage media may be any available media that may be accessed by a computer or a processor. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the present invention, as defined by the following claims.

What is claimed is:

1. A method for improved security for a core on a system-on-a-chip (SoC) in a portable computing device (PCD), the method comprising:
   beginning initialization of a monitor module on the SoC;
   sending a request for a monitor boot code from the monitor module of the SoC to the core of the SoC, the monitor boot code configured to allow the monitor module to complete initialization;
   receiving at the monitor module a response from the core;

checking by the monitor module a timer in communication with the monitor module, the timer configured to only be reset by the monitor module; and resetting the timer with the monitor module if the response from the core includes the monitor boot code and is received at the monitor module before expiration of the timer, applying with the monitor module at least one security measure to the core as a result of the timer expiring, wherein applying with the monitor module at least one security measure to the core as a result of the timer expiring further comprises: applying with the monitor module at least one security measure according to a security level state.

2. The method of claim 1, wherein the at least one security measure further comprises:

reinitializing the SoC as a result of the timer expiring.

3. The method of claim 1, wherein the at least one security measure further comprises one or more of:

preventing the core from accessing a set of data stored on the PCD, preventing the core from accessing one or more of a plurality of components on the SoC, and causing a warning to appear on a display of the PCD.

4. The method of claim 1, wherein applying with the monitor module at least one security measure to the core as a result of the timer expiring further comprises:

applying with the monitor module at least one security measure according to a number of times the timer has expired.

5. The method of claim 1, wherein:

the core comprises a processor located on the SoC executing a high-level operating system (HLOS).

6. The method of claim 1, wherein receiving at the monitor module a response from the core further comprises:

receiving at the monitor module information about a status for the core; and determining at the monitor module whether the status for the core has changed since an initialization of the core.

7. The method of claim 1, wherein receiving at the monitor module a response from the core further comprises further comprises:

receiving at the monitor module a communication sent from a computer device physically remote from the PCD.

8. A computer system for improved security for a core in a portable computing device (PCD), the system comprising:

a core on a system-on-a-chip (SoC);

a monitor module on the SoC in communication with the core; and a timer in communication with the monitor module, the timer configured to only be reset by the monitor module, wherein the monitor module is configured to:

send a request for monitor boot code to the core, the monitor boot code configured to allow the monitor module to complete initialization;

receive a response from the core; and reset the timer if the response includes the monitor boot code and is received by the monitor module before expiration of the timer, apply at least one security measure to the core as a result of the timer expiring;

apply a security measure to the core according to a security level state.

9. The system of claim 8, wherein the security measure comprises:

reinitializing the SoC and the monitor module as a result of the timer expiring.

10. The system of claim 8, wherein the security measure comprises at least one of:

preventing the core from accessing a set of data stored on the PCD, preventing the core from accessing one or more of a plurality of components on the SoC, and causing a warning to appear on a display of the PCD.

11. The system of claim 8, wherein the monitor module is further configured to:

apply at least one of a plurality of security measures to the core according to a number of times the timer has expired.

12. The system of claim 8, wherein:

the core comprises a processor located on the SoC executing a high-level operating system (HLOS); and the monitor module comprises a virtual portion of the processor.

13. The system of claim 8, wherein receive a response from the core further comprises:

receive at the monitor module information about a status for the core; and determine at the monitor module whether the status for the core has changed since an initialization of the core.

14. The system of claim 8, wherein receive a response from the core further comprises:

receive at the monitor module a communication from a computer device physically remote from the PCD.

15. A computer program product comprising a non-transitory computer usable medium having a computer readable program code embodied therein, said computer readable program code adapted to be executed to implement a method for improved security for a core in a portable computing device (PCD), the method comprising:

beginning initialization of a monitor module on the SoC;

sending a request for a monitor boot code from the monitor module of the SoC to the core of the SoC, the monitor boot code configured to allow the monitor module to complete initialization;

receiving at the monitor module a response from the core;

checking by the monitor module a timer in communication with the monitor module, the timer configured to only be reset by the monitor module; and resetting the timer with the monitor module if the response includes the monitor boot code and is received at the monitor module before expiration of the timer, applying with the monitor module at least one security measure to the core as a result of the timer expiring, wherein applying with the monitor module at least one security measure to the core as a result of the timer expiring further comprises: applying at least one security measure according to a security level state.

16. The computer program product of claim 15, wherein the at least one security measure further comprises one or more of:

reinitializing the SoC and the monitor module as a result of the timer expiring, preventing the core from accessing a set of data stored on the PCD, preventing the core from accessing one or more of a plurality of components on the SoC, and causing a warning to appear on a display of the PCD.

17. The computer program product of claim 15, wherein applying a with the monitor module at least one security measure to the core as a result of the timer expiring further comprises:

applying at least one security measure according to a number of times the timer has expired.

18. The computer program product of claim 15, wherein: the core comprises a processor located on the SoC executing a high-level operating system (HLOS).

19. The computer program product of claim 15, wherein receiving at the monitor module a response from the core further comprises:
    receiving at the monitor module information about a status for the core; and
    determining at the monitor module whether the status for the core has changed since an initialization of the core.

20. The computer program product of claim 15, wherein receiving at the monitor module a response from the core further comprises:
    receiving at the monitor module a communication sent from a computer device physically remote from the PCD.

21. A computer system for improved security for core in a portable computing device (PCD), the system comprising:
    means for beginning initialization of a monitor module on the SoC;
    means for sending a request for a monitor boot code from the monitor module of the SoC to the core of the SoC, the monitor boot code configured to allow the monitor module to compete initialization;
    means for receiving at the monitor module a response from the core;
    means for checking by the monitor module a timer in communication with the monitor module, the timer configured to only be reset by the monitor module; and
    means for resetting the timer if the response includes the monitor boot code and is received at the monitor module before expiration of the timer,
    means for applying at least one security measure to the core as a result of the timer expiring, wherein the means for applying at least one security measure to the core as a result of the timer expiring further comprises: means for applying at least one security measure according to a security level state.

22. The system of claim 21, wherein the at least one security measure further comprises one or more of:
    reinitializing the SoC and the monitor module as a result of the timer expiring,
    preventing the core from accessing a set of data stored on the PCD,
    preventing the core from accessing one or more of a plurality of components on the SoC, and
    causing a warning to appear on a display of the PCD.

23. The system of claim 21, wherein the means for applying at least one security measure to the core as a result of the timer expiring further comprises:
    means for applying at least one security measure according to a number of times the timer has expired.

24. The system of claim 21, wherein:
    the core comprises a processor located on the SoC executing a high-level operating system (HLOS).

25. The system of claim 21, wherein the means for receiving at the monitor module a response from the core further comprises:
    means for receiving at the monitor module information about a status for the core; and
    means for determining at the monitor module whether the status for the core has changed since an initialization of the core.

26. The system of claim 21, wherein the means for means for receiving at the monitor module a response from the core further comprises:
    means for receiving at the monitor module a communication sent from a computer device physically remote from the PCD.

* * * * *